United States Patent [19]
Funder et al.

[11] Patent Number: 5,695,701
[45] Date of Patent: Dec. 9, 1997

[54] APPARATUS AND A PROCESS FOR THE PREPARATION OF AN AGGLOMERATED MATERIAL

[75] Inventors: Christian Reedtz Funder, Fredensborg; Jens Mourits Sørensen, Virum; Morten Mohr Hansen, Herlev, all of Denmark

[73] Assignee: Niro Holding A/S, Soborg, Denmark

[21] Appl. No.: 564,149

[22] PCT Filed: Nov. 15, 1994

[86] PCT No.: PCT/DK94/00429

§ 371 Date: Dec. 21, 1995

§ 102(e) Date: Dec. 21, 1995

[87] PCT Pub. No.: WO95/13865

PCT Pub. Date: May 26, 1995

[30] Foreign Application Priority Data

Nov. 15, 1993 [WO] WIPO ............... PCT/DK93/00372
Jun. 3, 1994 [DK] Denmark ............................ 0629/94

[51] Int. Cl.[6] .............................................. B01J 2/16
[52] U.S. Cl. ............... 264/117; 264/40.1; 23/313 FB; 425/222
[58] Field of Search .................... 264/7, 117, 40.1; 425/222; 23/313 FB

[56] References Cited

U.S. PATENT DOCUMENTS

| | | |
|---|---|---|
| 4,000,563 | 1/1977 | Cubitt et al. . |
| 4,033,555 | 7/1977 | Fong . |
| 4,219,589 | 8/1980 | Niks et al. . |
| 4,264,552 | 4/1981 | McMahon et al. ............... 264/117 |
| 4,507,335 | 3/1985 | Mathur .............................. 427/215 |
| 4,698,190 | 10/1987 | Shibata et al. .................. 264/40.2 |
| 4,749,595 | 6/1988 | Honda et al. . |
| 4,832,700 | 5/1989 | Kaspar et al. ................. 23/313 FB |
| 4,980,106 | 12/1990 | Vogel .............................. 264/117 |
| 5,145,650 | 9/1992 | Hüttlin . |
| 5,211,985 | 5/1993 | Shirley, Jr. et al. . |

FOREIGN PATENT DOCUMENTS

| | | |
|---|---|---|
| 0436787 | 7/1991 | European Pat. Off. . |
| 2421278 | 5/1973 | Germany ...................... 23/313 FB |
| 1586765 | 8/1990 | U.S.S.R. ....................... 23/313 FB |

*Primary Examiner*—Mary Lynn Theisen
*Attorney, Agent, or Firm*—Sughrue, Mion, Zinn, Macpeak & Seas, PLLC

[57] ABSTRACT

An apparatus for the preparation of an agglomerated material from a powder or a liquid or both and having a trough-shaped fluidizing path, in the bottom part of which fluidization gas is blown in with an essential component directed towards the center line of the bottom of the path, gives a very advantageous material flow, which makes an effective agglomeration possible under attainment of superior product properties. The apparatus makes it possible by a process according to the invention to carry through the agglomeration with a particularly big powder humidity and a subsequent low re-humidification.

14 Claims, 2 Drawing Sheets

APPARATUS AND A PROCESS FOR THE PREPARATION OF AN AGGLOMERATED MATERIAL

BACKGROUND OF THE INVENTION

The invention relates to an apparatus for the preparation of an agglomerated material from a powder or a liquid or both and a process for such an agglomeration by use of the apparatus.

An increasing and widespread interest in the agglomeration of powdery materials exist within a large number of industries including the chemical and pharmaceutical industries not to mention the food industry.

There may be many reasons why it is desirable to transform a powdery material consisting of fine particles into a product consisting of relatively big, preferably homogenous agglomerates. As examples of such reasons may be mentioned the attainment of dust-elimination, free flowing property and a desired appearance as well, in particular in respect of foodstuff and feeding stuff products, the attainment of a good reconstitution ability, i.e. the ability to, without any essential mechanical stirring, quickly regenerate a liquid product corresponding to the one, on basis of which the powdery product was originally prepared. This ability to easily reconstitute is dependent on the ability of the material, when in contact with a liquid, to disperge, to be humidified and to dissolve, and particularly in respect of the dispersibility of powdery foodstuff and feeding stuff comparatively big homogenous agglomerates are desirable.

Various different processes and apparatuses are known for agglomerating powdery materials either in connection with the production thereof or as a subsequent processing step.

Processes of this type will in connection with atomization drying typically result in fine particles formed by the atomization drying being brought back to the atomization zone thereby getting in contact with atomized droplets, or only partially dried and therefore tacky particles, with which they are united. This back flow to the atomization zone, however, results in the fine, relative dry particles conveyed back being brought in contact with the hot drying gas and consequently exposed to damage from heat, as they, unlike the atomized droplets, are not protected against this through cooling caused by the evaporation of liquid. This entails that in connection with such an atomization drying an agglomeration is not normally carried out to an extent, which might actually be desirable.

For this reason, among others, it is usual to carry out the agglomeration as a separate after-processing step.

Other reasons why it may be desirable to carry out the agglomeration as a separate after-processing step are that hereby an increased operational reliability and flexibility and a better control of the product quality is attained. Furthermore, the use of a separate agglomeration step makes it possible in connection therewith to admix other components, for instance compounds which would be damaged by passing through the atomization dryer, or which in advance are present as powder. Finally, agglomeration as a separate after-processing step is used, when it is desired to use existing atomization drying plants which deliver unagglomerated products in connection with the preparation of agglomerated products.

Such an agglomeration in a separate step may be carried out in accordance with differing principles depending on the desired product properties, for instance by spraying on of a liquid during mechanical processing, when compact agglomerates are desired, or by spraying a liquid on the powdery material when it is present in a fluidized bed.

The present invention is related to agglomeration according to the last-mentioned principle.

In a typical embodiment of a process using this principle the powdery material is introduced into the fluidized bed with a moisture content so low that an effective fluidization of the material is secured by means of the fluidizing ability inherent in the bed in question.

The fluidized powder will then, by passing a number of successive nozzles and intermediary areas without nozzles alternatingly, be humidified for the attainment of an agglomeration-enhancing moisture content and then dried to ensure the fluidizability of the powdery material and for stabilizing the attained agglomerated before passing the next nozzle, where a re-humidification takes place, then agglomeration again and renewed drying, which cycle is typically repeated several times.

On account of the limited fluidization ability of the known agglomeration apparatus it has in such processes been necessary to carry out a substantial drying of the powder during and between its passing the nozzles. This has, however, entailed that the demand to re-humidification at the individual nozzle passages has increased in order to attain for a short period the necessary moisture content for the agglomeation, the material of the individual agglomerates being during the passage through the fluidized bed exposed to a number of fairly extensive re-humidifying and drying steps.

These extensive re-humidification and drying steps have, however, in respect of many materials, an undesirable influence on the quality of the resulting product.

Thus, if fatty food products, such as whole milk powder, fatty whey products, calves forage, babyfood and the like are processed, these steps will result in an increased amount of the fat of the product reaching the surface of the particles, which results in the content of so-called free fat becoming too big, whereby its ability to be humidified by water becomes too small, and in the worst case an increase of the risk of fat drops forming when stirred into water occurs.

Moreover, these re-humification steps, which due to the fact that the intermediate drying steps are to be carried through for the attainment or the maintenance of an easy fluidizability of the powder, have to be extensive, may result in a deterioration of the quality of the product, due to the fact that the dissolution and evaporation processes on the surface of the particles destroy their porous structure.

SUMMARY OF THE INVENTION

It has now turned out that better product properties can be attained, and moreover a number of other advantages, by using a special apparatus for the agglomeration, which makes it possible to maintain an increased moisture content in the powdery material during the agglomerating processes.

By designing the apparatus in such a way that it is able to ensure an effective and controlled fluidization of the material, even though it has a large moisture content, the number of re-humidification steps can be considerably reduced to comprise only a smaller addition of liquid, and the abovementioned deterioration of the product quality caused by the re-humidification steps can be avoided.

To this may be added that the apparatus according to the invention, among others due to the fact that the ratio between its width and its length is very big, makes it possible to obtain large agglomerates with a narrow particle size distribution, which will often make subsequent classification operations with a possible return of too big particles, after their grinding, or too small particles, superfluous.

The apparatus according to the invention makes as mentioned a very effective fluidization possible, and this does not only entail the above advantages on account of the reduced need for re-humidification, but further makes it possible to process materials, which for other reasons than their moisture content are difficult to fluidize. This applies in particular to very fine-grained, cohesive powders.

It is furthermore an advantage of the apparatus according to the invention that contrary to what is the case in conventional fluidization apparatuses it makes a homogenous treatment of particles with unhomgenous particle size possible, as these particles, which will appear from below, pass the apparatus in a path, which is to a great extent independent from the particle size.

The last-named property of the apparatus in combination with the very strong movement, to which the material to be processed is exposed in the apparatus, makes it suitable for treatments, in which also a mixing of different components takes place.

Other advantages of the apparatus according to the invention will appear from the following description.

According to the above the invention relates to an apparatus for the preparation of an agglomerated material from a powder or a liquid or both and comprises a perforated plate and means to provide through its perforations a flow of fluidizing and drying gas and possibly cooling gas, sufficient for keeping a powdery material in a fluidized state in a zone immediately above the plate, outlets for agglomerated material and at least one nozzle for spraying an atomized liquid on the fluidized powder, which apparatus is characteristic in that the perforated plate is designed in such a way that it together with non-perforated side walls forms a trough-shaped path leading to said outlets, the perforated plate forming the bottom of the trough-shaped path, and in that a substantial part of the perforations of the perforated plate is directed such that the fluidizing gas and the drying or cooling gas after passage through each of these flow in a direction parallel with the longitudinal direction of the trough-shaped path and towards the outlets for agglomerated material or in a direction perpendicular thereto towards a centre line in the path or in a direction between these two directions, the gas flow from the perforations being adapted to co-operate for the attainment of a conveyance of material to the outlets through the trough-shaped path, where the material during its conveyance along the path is whirled upwards above its centre line and flows down along the side walls.

The starting material may as mentioned be a powder, in which case the apparatus is provided with inlets for powder to said zone above the perforated plate, which inlets are positioned at a distance from the outlets. If the starting material is a solution or a suspension it is introduced through at least one nozzle.

The trough-shaped path, the bottom part of which is constituted by the perforated plate, is preferably designed with a length which is several times greater than the width of the path, for the attainment of a typical plug flow of the material without essential back flow, a homogenous treatment of the individual particles being thus attained.

The trough-shape of the path ensures together with the described orientation of the perforations in the perforated plate serving as air distributor that the main pattern of movement of the material in the apparatus is a double-whirl movement, in which the material flows along the bottom towards the centre line of the path, and in which the flow becomes upwardly directed and at a certain distance from the bottom turns outwards against the sides and downwards along the side walls. As at least some of the perforations lead the gas flow in a direction either directed against or with some component against the outlet for processed material, the material is simultaneously with the quick whirl movement subjected to a slow displacement throught the whole of the trough-shaped path of the apparatus.

The quick whirl movement, which has the effect that the fluidizing gas flows at a comparatively big velocity along the bottom of the trough-shaped path, as well as the fact that the trough-shaped path, contrary to the constructions normally used for related purposes, does not have socalled "dead" areas, where tacky powdery material deposits, has the effect that by use of the apparatus agglomerating processes can be carried through, in which in the initiating phases a substantially bigger moisture content is maintained in the powder than what has been possible by the conventional apparatuses.

By working with such an increased moisture content, the drawbacks related to a heavy re-humidification can to an essential degree be avoided, cf. the above.

The perforated plate at the bottom of the trough-shaped path may be designed in many ways. Preferably, it comprises a lower part which is a substantially horizontally perforated plate extending centrally throughout the length of the apparatus, and two oblique perforated plates extending on either side of the horizontal plate and connecting the latter with the two non-perforated side walls.

Alternatively, the perforated plate is constituted by a plate with a curved cross-section profile connecting the two non-perforated side walls.

It is, however, also possible by means of the directionally controlled blowing in of the fluidizing air through the perforated plate to attain the desired flow pattern, for which reason the perforated plate may be only a horizontal plate extendng between the two non-perforated side walls.

In a preferred embodiment of the apparatus according to the invention the nozzle/nozzles which is/are used for spraying liquid on to the powdery material are positioned centrally in the very zone, in which the fluidized material is present during the operation of the apparatus, and is upwardly directed. What is achieved partly, is that the nozzles to an extensive degree are kept clean from the upwards flow of powder and gas, partly that the nozzles contribute to the desired whirl movement, in particular in case of two-component nozzles, such being preferred, when the atomization pressure air emanating from the nozzles enhances the upward flow around the nozzles.

The nozzles are intended, when the starting material is a powder, to supply an auxiliary liquid enhancing the agglomeration and perhaps enhancing the attainment of further desired properties of the product, for instance by coating. When the starting material is a solution or a suspension, the nozzles are used for atomization thereof on particles already formed in the fluidizing bed.

Preferred embodiments of the apparatus according to the invention will be explained in detail in the following with reference to the drawing.

It should be noted that the use of the perforated gas distributing plate with a directional supply of fluidization air under the attainment of a whirl movement pattern is known per se, also in connection with non-planar air distributing plates, see U.S. Pat. No. 4,033,555, but said prior art relates to apparatuses for use for a quite different purpose than agglomeration, viz. apparatuses aiming on the contrary at a disintegration of mutually adhesive particles, a purpose almost opposite to the one aimed at by the present invention.

It is on this background particularly surprising that by use of the apparatus according to the invention it is possible to achieve particularly large agglomerates, in respect of foodstuff thus typically up to 5–600 μm and in respect of some products up to several mm, as it would have been expected that the strong whirl movement on the contrary would entail disintegration of such big agglomerates.

The invention also relates to a process for agglomeration of a powdery material by use of the apparatus in question, said process being characteristic in that by controlling one or more parameters chosen among: moisture content of the starting material and the amount thereof, amount of atomized liquid, sprayed on the fluidized powder, amount of fludization and drying gas and temperature and moisture thereof, a greater moisture content is maintained in the fluidized powdery material than what would have been the maximally possible moisture content by conventional fluidization with only vertically directed fluidization gas of the powdery material in question.

BRIEF DESCRIPTION OF THE DRAWINGS

The invention is described in detail in the following with reference to the drawing, in which.

DESCRIPTION OF THE PREFERRED EMBODIMENTS

Figure 1:
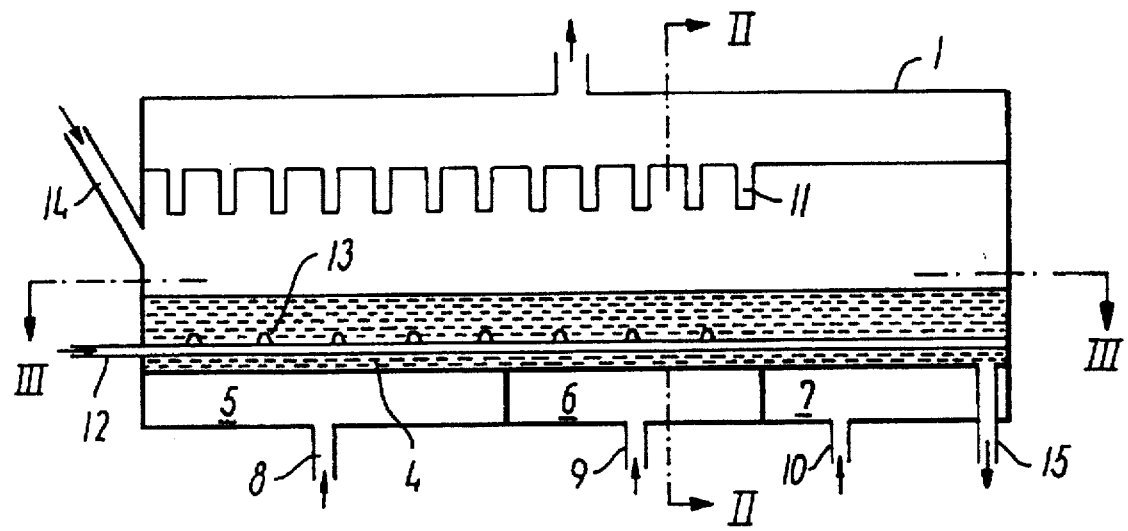
FIG. 1 is a schematic cross-sectional view of an embodiment of an apparatus according to the invention.
Figure 2:
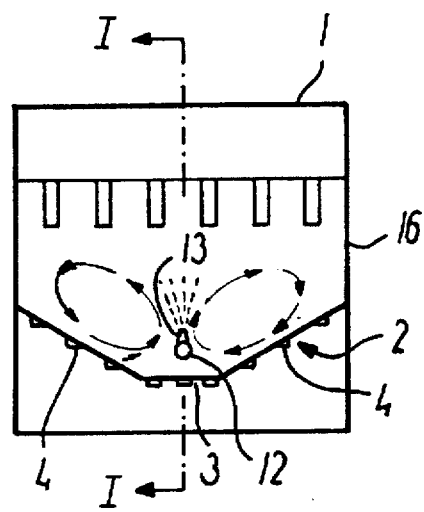
FIG. 2 is a schematic cross-sectional view through the same embodiment along the line II—II of FIG.
Figure 3:
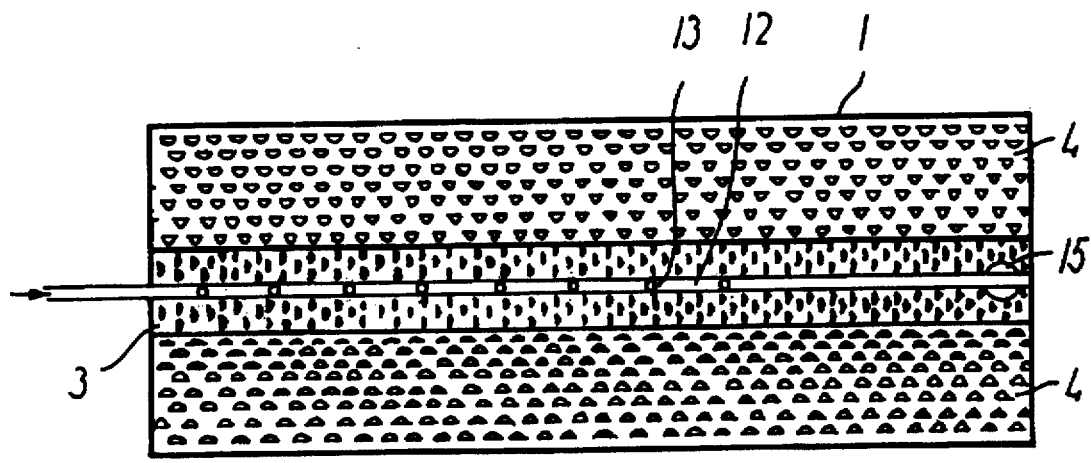
FIG. 3 is a schematic horizontal view seen from above through the same embodiment, taken along the line III—III of FIG. 1, and FIG. 4 schematically shows a sectional view of another embodiment of a part of the apparatus corresponding to the one shown in FIG. 3.

In FIGS. 1–3 a sectional view of an embodiment of an apparatus according to the invention is shown with a housing 1, in which a perforated air distributing plate 2 is provided, said plate in the embodiment shown being constituted by a horizontal plane section 3 and two oblique plane sections 4.

The perforations are in the embodiment shown so-called gill slits designed for instance as described in EP-A-474949.

As an alternative to the design of the air distributing plate 2 it may be designed as a plate evenly curved around its longitudinal axis, or it may, less preferred, be planar.

Below this plate a plenum chamber is provided, the chamber being divided in sections 5, 6, 7 by partition walls, to which through the ducts 8, 9, 10 fluidizing gas is supplied, for instance hot drying air through the ducts 8 and 9 and unheated cooling air through the duct 10.

Above the air distributing plate 2 a row of filters 11 are provided in the embodiment shown, through which filters the leaving gas flow passes in such a way that the fine particles entrained therewith are separated and fall back on the central part or the front part of the perforated plate.

Alternatively, the leaving gas with entrained particles is let out from the housing 1 and a removal of particles may take place in a separate plant (not shown) with possible subsequent back flow of the particles to the fluidized bed.

In the embodiment shown in FIGS. 1–3 a tubular construction 12 extends immediately above the centre line in section 3 for supply of moisturing liquid and atomization pressure gas or vapour.

This tubular construction carries a number of upwardly directed two-component nozzles 13.

Alternatively, these nozzles may be introduced from the bottom through the air distributing plate 2 and may for instance discharge in level with the upper surface of the horizontal section 3 or be taken somewhat above it. Such an embodiment is outlined in FIG. 4, which will be explained in detail in the following.

In one end of the apparatus inlet means 14 are provided for the introduction of the powdery material which is to be agglomerated to a zone positioned immediately above the air distributing plate 2, whereas in the opposite end of the apparatus outlet means 15 for the agglomerated product are provided.

If the apparatus is to be exclusively used for processes, in which the starting material is solely liquid, i.e. a solution or a suspension, the inlet means 14 may be omitted.

During the operation of the apparatus the powdery material to be processed is continuously supplied through 14, and fluidization gas is as mentioned supplied through the ducts 8, 9, and 10.

In the embodiment shown of the air distributing plate the openings in the central, horizontal section are directed in such a way that the gas exits therefrom parallel to the longitudinal direction of the air distributing plate and in a direction towards the outlet means 15 for agglomerate. The gas which leaves through the openings in the two oblique sections 4 is, however, directed perpendicularly thereto and is in respect of each section 4 directed towards the centre line of the air distributing plate. The gas from the two sections 4 will thus substantially impart a movement pattern to the powder introduced like the one shown in FIG. 2, whereas the gas departing through the openings in the horizontal section 2 ensures the conveyance of the material longitudinally through the apparatus. This combination is considered particularly advantageous as big agglomerates and lumps, if any, will fall down towards section 3 and will there be subjected to a quick conveyance towards the outlet means 15 in such a way that they quickly leave the apparatus without participating in any further formation of agglomerate.

Alternatively, the orientation of the openings of the plate may be identical within each half of the plate, the gas being substantially directed towards the centre line of the plate, but with some component towards the outlets.

When the powdery material in the trough-shaped path formed by the air distributing plate 2 and side walls 16 performs the whirl movement shown in FIG. 2, it will during the upwards movement in the central part be subjected to a very homogenous moisturing from the liquid atomized from the nozzles 13.

This fact that the moisturing may be performed very homogenously with only a slight risk of local over-moisturing results in that during operation of the apparatus it becomes possible to work with a powder moisture content close to the maximum acceptable level, the level being besides very high on account of the particularly good fluidization properties of the apparatus.

This has the effect that the powdery material may either be introduced with big humidity, or operation may be carried out with such a low drying capacity of the fluidization air that a big powder moisture is maintained/attained in the agglomeration phase, and only a supply of a fairly small amount of liquid is required for re-moisturing the material.

Figure 4:
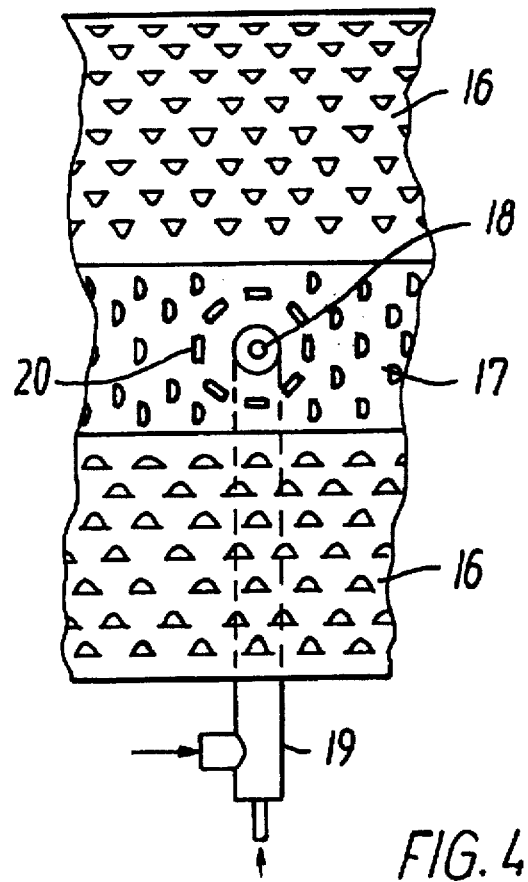

In the sectional view shown in FIG. 4 the sections 16 correspond in principle to the sections 4 of the embodiment shown in FIGS. 1-3, whereas the section 17 corresponds to section 3 and is thus a horizontal plate. The orientation of the openings of the sections 16 and 17 corresponds to what is described in connection with FIGS. 1-3. Up through the section 17 a nozzle extends, which through a tubular construction 19 below the perforated plate supplies moisturing liquid and pressure gas or vapour to the nozzle 18. Around the nozzle in section 17 a ring of openings 20 is provided, which supplies gas from the underlying plenum chamber in a direction away from the nozzle. Hereby is achieved that the amount of circulating powder in the area immediately around and in front of the nozzle is reduced, in such a way that partly depositing of powder on the nozzle with subsequent deterioration of the atomization is avoided, and partly the risk of local over-humidification of powder immediately in front of the nozzle opening is reduced.

In the sections 16 and 4, but preferably in the sections 17 and 3, vertical holes may further be provided, through which part of the fluidizing air may pass, for instance with a view to increasing the centrally upwards flow in the fluidizing powdery layer.

The apparatus according to the invention is, as will be seen, particularly suited for carrying out the process described, in which a high moisture percentage in the powdery material is maintained during agglomeration, and hereby it is made posible to attain product properties which in respect of the size of agglomerates and distribution of the size of agglomerates are superior over the prior art, as big agglomerates are attained with such a narrow distribution of grain-size that a subsequent classification is made superfluous. To this may be added that the product is attained without deterioration of the quality which may be caused by heavy re-humidification, and that the agglomerates may be obtained with a desired physical strength which allows handling and transport without decomposition, the binding together of the individual particles being at the same time not so strong that their disintegration during reconstitution in the liquid phase is delayed or hindered.

The good fluidization properties of the apparatus and the movement of pattern for the material therein, which is characteristic in two partially united, parallel helical paths extending in the longitudinal direction of the apparatus, ensure a good mixing of the material, the movement through the apparatus, seen in the longitudinal direction, being simultaneously essentially a plug flow without essential back flow, in such a way that the good mixing properties of the apparatus are not attained at the expense of the advantages in respect of a homogenous treatment caused by the plug flow.

The liquid atomized through the nozzles 13 may be water, where this is sufficient for imparting a sufficient mutual adhesion to the powdery particles. However, the liquid fluidized through said nozzles may also be a solution, a suspension or an emulsion, at the drying of which compounds remain, which further the formation of agglomerates or impart the necessary strength thereto or which form a coating on the particles present in the apparatus for improving their properties, such as is known within many industries, including the pharmaceutical industry and the detergent industry. The coating may either be carried out with the same compound, of which the particles or part of these are constituted, or it may be formed by means of an auxiliary compound of another type, for instance with a film-forming polymer.

Typically, but not necessary, such a coating operation may take place in the lower part of the apparatus, with respect to the flow direction of the material.

If the liquid supplied through the nozzles is a solution, a suspension or an emulsion of the material to constitute the final product, the ratio between the material, which is introduced into the apparatus as a powder, and the material which is introduced as a liquid, may vary within so wide limits that the total amount of solid may be introduced with the liquid through the nozzles, the apparatus thus functioning as an actual drying apparatus and the good fluidization properties and the homogenous particle treatment being also in this case of essential importance. If the entire amount of solid of the end product is supplied with the liquid phase sprayed in through the nozzles, it is apparently not necessary to provide the apparatus with the above described and in the claims mentioned inlet means 14 for powdery material.

The apparatus according to the invention may be designed in such a way that it comprises a number of parallel trough-shaped paths, each comprising a perforated plate and being mutually separated by vertical or steeply slanting side walls, said paths being connected in series for passage of powder or agglomerate therethrough.

Furthermore, the invention may be carried out in conncection with processes similar to the known "Multi Stage Drying", i.e. a process, in which a fluidized bed built together with an atomization plant is used, the product therefrom being directly received in the fluidized bed.

In the last-named embodiment the apparatus according to the invention is characteristic in comprising an atomization drying chamber with a bottom section, the lower part of which constitutes said inlets for powdery material to the zone above the air distributing plate. As it is important for the effective fluidization and in particular the important plug flow that the length of the trough-shaped path is great compared to its width, it is preferred in said embodiment in which the fluidized bed is connected directly to an atomization chamber that the apparatus comprises at least two parallelly extending trough-shaped paths, the paths each having an end extending under the bottom section of the atomization drying chamber for direct receipt of powdery material therefrom. The fluidization gas, which leaves this fluidized bed, may in this case be recovered together with the used atomization drying gas from the atomization drying chamber, but it may, in order to avoid introducing the relatively cool fluidization gas in the chamber, be advantageous to use a separate outlet for the fluidization gas.

The invention is described in detail with reference to the following examples.

EXAMPLE 1

In this example an apparatus according to the invention was used, in which the perforated plate was substantially horiziontal but had upwardly bent edges united with the nearly vertical side walls of the trough-shaped path. The width of the perforated plate was 32 cm, and the total length of the trough-shaped path comprising six plate units was 15 m, divided into a first section of 2.5 m, a second section of 5 m, and a third section of 7.5 m.

The perforations of the plate were so-called gill slits, which were all directed towards the centre line of the perforated plate with a small component in the longitudinal direction of the path towards the outlet for finished agglomerate.

A fatty milk substitute consisting of a mixture of a number of different ingredients was used as starting material.

The particle size distribution of this starting material was as follows:

| % <75 um: 34 | $d_{10}$: 10% <30 um |
|---|---|
| % <150 um: 66 | $d_{50}$: 50% <105 um |
| % <250 um: 87 | $d_{90}$: 90% <265 um |
| % <425 um: 100 | |
| % <600 um: 100 | span: $(d_{90}-d_{10})/d_{50} = 2.24$ |
| % <710 um: 100 | |

The amount of free fat in the starting material was 1.71%.

Fluidizing air at a temperature of 75° C. was led to the apparatus, which resulted in a powder temperature in the range of 30° C. to 35° C. through the apparatus.

The milk substitute was added in an amount of 3500 kg/hour, and spraying of water through the nozzles only corresponded to 8% of the amount of powder introduced.

The resulting agglomerate had, when recovered directly from the agglomeration appraatus, i.e. without subsequent classification, the following particle size distribution:

| % <75 um: 5 | $d_{10}$: 10% <90 um |
|---|---|
| % <150 um: 23 | $d_{50}$: 50% <255 um |
| % <250 um: 49 | $d_{90}$: 90% <470 um |
| % <425 um: 84 | |
| % <600 um: 99 | span = $(d_{90}-d_{10})/d_{50} = 1.50$ |
| % <710 um: 100 | |

The content of the agglomerated product of free fat was 1.45%. This decrease of the amount of free fat must be attributed to the fact that the agglomerated final product had a smaller surface than the starting material, but although this fact is taken into account, the analyses of free fat can be taken as a proof that the increase of the amount of free fat on the individual particles, which occurs by conventional processes with a more intensive re-humification, has been substantially avoided by use of the apparatus according to the invention.

Comparing the results with those of known processes for agglomeration it is notable that the product obtained has a quite narrow particle size distribution, which is particular excelling by the absence of very big particles. A product like the one in question agglomerated in a conventional way would typically have a substantially wider particle size distribution, which would be expressed in that the span-value would typically be 2.0 or more.

EXAMPLE 2

The same apparatus as the one described in Example 1 was used, and the staring material was also here a fatty milk substitute, and the agglomeration liquid was water.

For agglomeration of 1500 kg/hour starting material 165 kg/hour water was sprayed on corresponding to 11% of the starting material.

The inlet temperature of the fluidizing gas was 60° C., and the powder temperture through the plant was in the range of 30° C. to 35° C.

The particle size distribution of the end material was determined after the passage of the material through the first section, after its passage through the second section and in the end product.

The results were as follows:

| | Starting material | Section 1 | Section 1 | End product |
|---|---|---|---|---|
| $d_{90}$: 90% < d, μm | 255 | 475 | 532 | 653 |
| $d_{50}$: 50% < d, μm | 93 | 230 | 291 | 380 |
| $d_{10}$: 10% < d, μm | 26 | 72 | 109 | 174 |
| Span = $(d_{90}-d_{10})/d_{50}$ | 2.46 | 1.76 | 1.45 | 1.26 |

It appears from these results that the agglomeration taking place during the passage of the material through the apparatus does not only entail a quite considerable increase of the average particle size but also that during this pasage a desired narrowing of the particle size distribution occurs.

We claim:

1. An apparatus for the preparation of an agglomerated material from a powder or a liquid or both, and comprising a perforated plate (2) and means (5, 6, 7, and 8, 9, 10) to provide through its perforations a flow of fluidizing and drying gas and possibly cooling gas, sufficient for keeping a powdery material in a fluidized state in a zone immediately above the plate, outlet means (15) for agglomerated material and at least one nozzle (13) for spraying an atomized liquid on the fluidized powder, characterized in that the perforated plate (2) is designed in such a way that together with non-perforated side walls (16) it forms a trough-shaped path leading to said outlet means (15), the perforated plate (2) forming the bottom of the trough-shaped path, that a substantial part of the perforations of the perforated plate (2) is directed such that the fluidizing gas and the drying or cooling gas after passage through each of these flow in a direction parallel to the longitudinal direction of the trough-shaped path and towards the outlet means (15) for agglomerated material or in a direction perpendicular thereto towards a centre line in the path or in a direction between these two directions, the gas flow from the perforations being adapted to co-operate for the attainment of a conveyance of material to the outlet means (15) through the trough-shaped path, wherein the material during its conveyance along the path is whirled upwards above its centre line and flows down along the side walls (16).

2. An apparatus according to claim 1 for agglomeration of a powder, characterized in that inlet means (14) for powder to said zone are provided at a distance from the outlet means (15).

3. An apparatus according to claim 1, characterized in that the perforated plate (2) comprises a lower part which is a substantially horizontally perforated plate (3) extending centrally throughout the length of the apparatus, and two oblique perforated plates (4) extending on either side of the horizontal plate (3) and connecting the latter with the two non-perforated side walls (16).

4. An apparatus according to claim 1, characterized in that the perforated plate is a plate having a curved cross-section profile connecting the two non-perforated side walls (16).

5. An apparatus according to claim 1, characterized in that the perforated plate is a horizontal plate extending between the two non-perforated side walls (16).

6. An aparatus according to claim 1, characterized in that said at least one nozzle is positioned in the centre plane of the trough-shaped path and in the zone, in which the fluidized material is present during the operation of the apparatus, and in that it is directed upwards.

7. An apparatus according to claim 6, characterized in that said at least one nozzle consists of a number of two-component nozzles (13).

8. An apparatus according to claim 3, characterized in that the perforations of the horizontal plate (3) are directed in such a way that they supply fluidization gas completely or substantially in a direction parallel to the centre line of the trough-shaped path and towards the outlet means (15), whereas the perforations of the oblique perforated plates (4) are directed in such a way that they supply gas completely or substantially in directions perpendicular to the centre line.

9. An apparatus according to claim 1, characterized in that it comprises a number of paths put parallelly together, each path comprising a perforated plate, which paths are mutually separated by vertical or steeply slanting sidewalls and connected in series for passage therethrough of powder or agglomerates.

10. An apparatus according claim 1 characterized in comprising an atomization drying chamber with a bottom section, the lower part of which constitutes said inlet means.

11. An apparatus according to claim 10, characterized in that it comprises at least two parallelly extending paths leading to common outlets, said paths having each an end extending under said bottom section for direct receipt of powdery material from the atomization drying chamber.

12. An apparatus according to claim 1, characterized in being provided with, means for supplying an air flow around said at least one nozzle (18) to reduce the amount of powder immediately in front of the nozzle opening.

13. An apparatus according to claim 8, characterized in being provided with means for supplying an air flow around said at least one nozzle (18) to reduce the amount of powder immediately in fornt of the nozzle opening.

14. A process for agglomeration of a powdery starting material comprising the steps of: passing said material through a trough shaped path of which the bottom portion is formed by a perforated plate, subjecting the material while passing said path to the influence of fluidizing and drying or cooling gas ejected through the perforations of said perforated plate in a direction parallel to the longitudinal direction of the trough-shaped path and towards outlet means for agglomerated material or in a direction perpendicular thereto towards a centre line of the path or in a direction between these two directions, thereby conveying the material to said outlet means through the trough-shaped path and whirling the material upwards above said centre line and down along side walls of the trough-shaped path during its conveyance along said path, and spraying an atomized liquid onto the fluidized material, wherein one or more parameters chosen among: moisture content of the starting material and the amount thereof, amount of atomized liquid sprayed on fluidized material, amount of fluidization and drying gas and temperature and humidity thereof, are controlled to maintain a greater moisture content during agglomeration in the fluidized powdery material than what would have been the maximally possible moisture content by conventional fluidization of the powdery material in question.

* * * * *